(12) United States Patent
Chen

(10) Patent No.: US 10,820,720 B2
(45) Date of Patent: Nov. 3, 2020

(54) SPRING OSCILLATION ELECTROMAGNETIC CRADLE

(71) Applicant: Sih-Han Chen, Taipei (TW)

(72) Inventor: Sih-Han Chen, Taipei (TW)

( * ) Notice: Subject to any disclaimer, the term of this patent is extended or adjusted under 35 U.S.C. 154(b) by 272 days.

(21) Appl. No.: 15/964,234

(22) Filed: Apr. 27, 2018

(65) Prior Publication Data

US 2019/0328152 A1 Oct. 31, 2019

(51) Int. Cl.
*A47D 9/02* (2006.01)
*H02K 33/10* (2006.01)

(52) U.S. Cl.
CPC ............... *A47D 9/02* (2013.01); *H02K 33/10* (2013.01)

(58) Field of Classification Search
CPC .................................. A47D 9/02; H02K 33/10
See application file for complete search history.

(56) References Cited

U.S. PATENT DOCUMENTS

| | | | | |
|---|---|---|---|---|
| 4,738,369 A * | 4/1988 | Desjardins | ............ | F16M 11/28 211/113 |
| 4,752,980 A * | 6/1988 | Nafte | ....................... | A47D 9/04 5/108 |
| 5,048,135 A * | 9/1991 | Chen | ........................ | A47D 9/02 5/106 |
| 5,307,531 A * | 5/1994 | Kao | ......................... | A47D 9/02 248/140 |
| 9,888,787 B1 * | 2/2018 | Chen | ....................... | H02K 33/10 |
| 2016/0000232 A1 * | 1/2016 | Horst | ....................... | A47D 5/00 5/655 |
| 2019/0059610 A1 * | 2/2019 | Chen | ........................ | A47D 9/02 |
| 2019/0075935 A1 * | 3/2019 | Ng | ............................ | H02K 7/14 |
| 2019/0247611 A1 * | 8/2019 | Karp | ......................... | A47D 9/02 |
| 2019/0274448 A1 * | 9/2019 | Tootell | .................... | A47D 13/02 |

* cited by examiner

*Primary Examiner* — David R Hare
*Assistant Examiner* — Adam C Ortiz
(74) *Attorney, Agent, or Firm* — Alan D. Kamrath; Mayer & Williams PC

(57) ABSTRACT

An electromagnetic cradle includes a support frame, a fixed unit mounted on the support frame, a movable unit mounted on the fixed unit, and an electromagnetic device secured on the support frame. The fixed unit includes two fixed rods secured on the support frame. Each of the fixed rods is provided with two mounting sleeves each of which is provided with a fixed tube. The movable unit includes a bed and two movable blocks. Each of the movable blocks is provided with two tracks, and the fixed rods extend through the tracks of each of the movable blocks. At least one spring is biased between each of the tracks and the respective fixed tube. At least one magnet is mounted is mounted on one of the movable blocks.

7 Claims, 5 Drawing Sheets

US 10,820,720 B2

SPRING OSCILLATION ELECTROMAGNETIC CRADLE

BACKGROUND OF THE INVENTION

1. Field of the Invention

The present invention relates to a cradle and, more particularly, to an electromagnetic cradle for petting or pacifying babies by shaking actions.

2. Description of the Related Art

A conventional cradle is used for placing a baby to facilitate the watcher caring and pacifying the baby. However, the conventional cradle is operated by a manual labor, thereby wasting the watcher's energy and time. A conventional motorized cradle is operated by a motor to save the manual labor. The motor drives a linkage to produce leftward and rightward swaying actions, so as to pacify the baby. However, the linkage is driven by the motor, so that the swaying action is not performed smoothly, thereby decreasing the swaying effect. In addition, the linkage complicates the structure of the conventional motorized cradle, thereby increasing the cost of fabrication.

BRIEF SUMMARY OF THE INVENTION

The primary objective of the present invention is to provide a spring oscillation electromagnetic cradle that produces more elastic and smooth rocking action by an electromagnetic force and an elastic oscillating force of springs.

In accordance with the present invention, there is provided an electromagnetic cradle comprising a support frame, a fixed unit mounted on the support frame, a movable unit mounted on the fixed unit, and an electromagnetic device secured on the support frame. The fixed unit includes two parallel fixed rods secured on the support frame. Each of the two fixed rods is provided with two mounting sleeves which are secured on each of the two fixed rods without producing relative displacement and rotation therebetween. Each of the mounting sleeves is formed with a flange protruding outward. Each of the mounting sleeves is provided with a roller and a fixed tube, with the roller being located between the flange and the fixed tube. The fixed tube is secured on each of the mounting sleeves without producing relative displacement and rotation therebetween. The movable unit includes a bed and two movable blocks mounted on a bottom of the bed. Each of the two movable blocks is provided with two tracks, and the two fixed rods of the fixed unit extend through the two tracks of each of the two movable blocks. Each of the two tracks has a plurality of slots. Each of the two tracks receives the roller and the fixed tube of one of the mounting sleeves. Each of the two tracks has a top closely abutting the respective roller. At least one spring is received in each of the two tracks and biased between each of the two tracks and the respective fixed tube. The at least one spring has two ends respectively secured to each of the two tracks and the respective fixed tube. At least one of the two movable blocks has a top provided with a receiving recess, and at least one magnet is mounted in the receiving recess. The at least one magnet has poles directed toward the same direction. The electromagnetic device is located under and corresponds to the at least one magnet of the movable unit.

According to the primary advantage of the present invention, the movable unit achieves a rocking or shaking effect by the magnetic reaction between the electromagnetic device and the at least one magnet, and by the oscillating elasticity of the springs, so that the movable unit is moved smoothly and elastically, so as to pacify the baby placed in the movable unit.

According to another advantage of the present invention, the electromagnetic cradle has a simplified construction, thereby decreasing the cost of fabrication and facilitating maintenance of the electromagnetic cradle.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
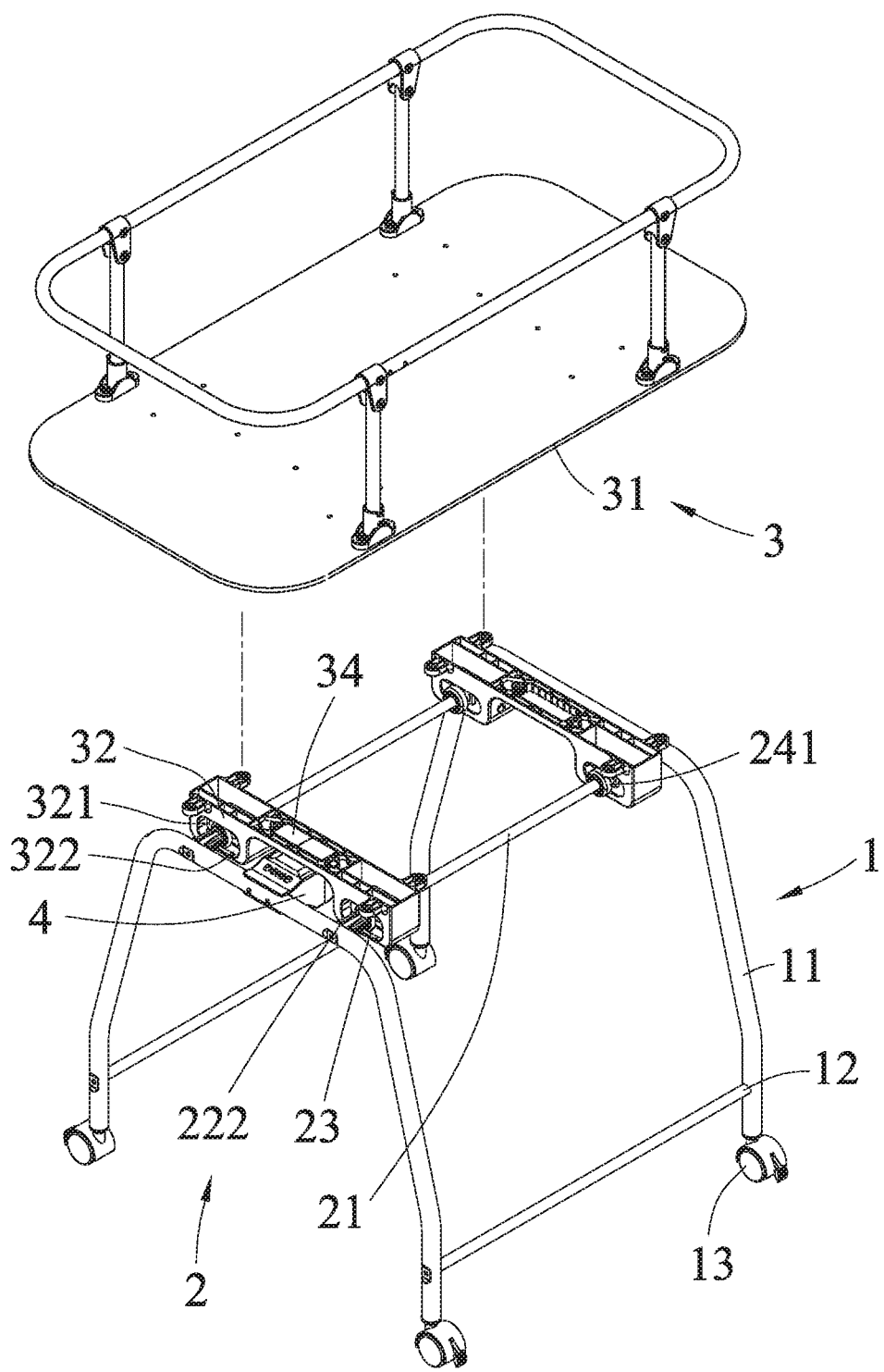
FIG. 1 is a partially exploded perspective view of an electromagnetic cradle in accordance with the preferred embodiment of the present invention.
Figure 2:
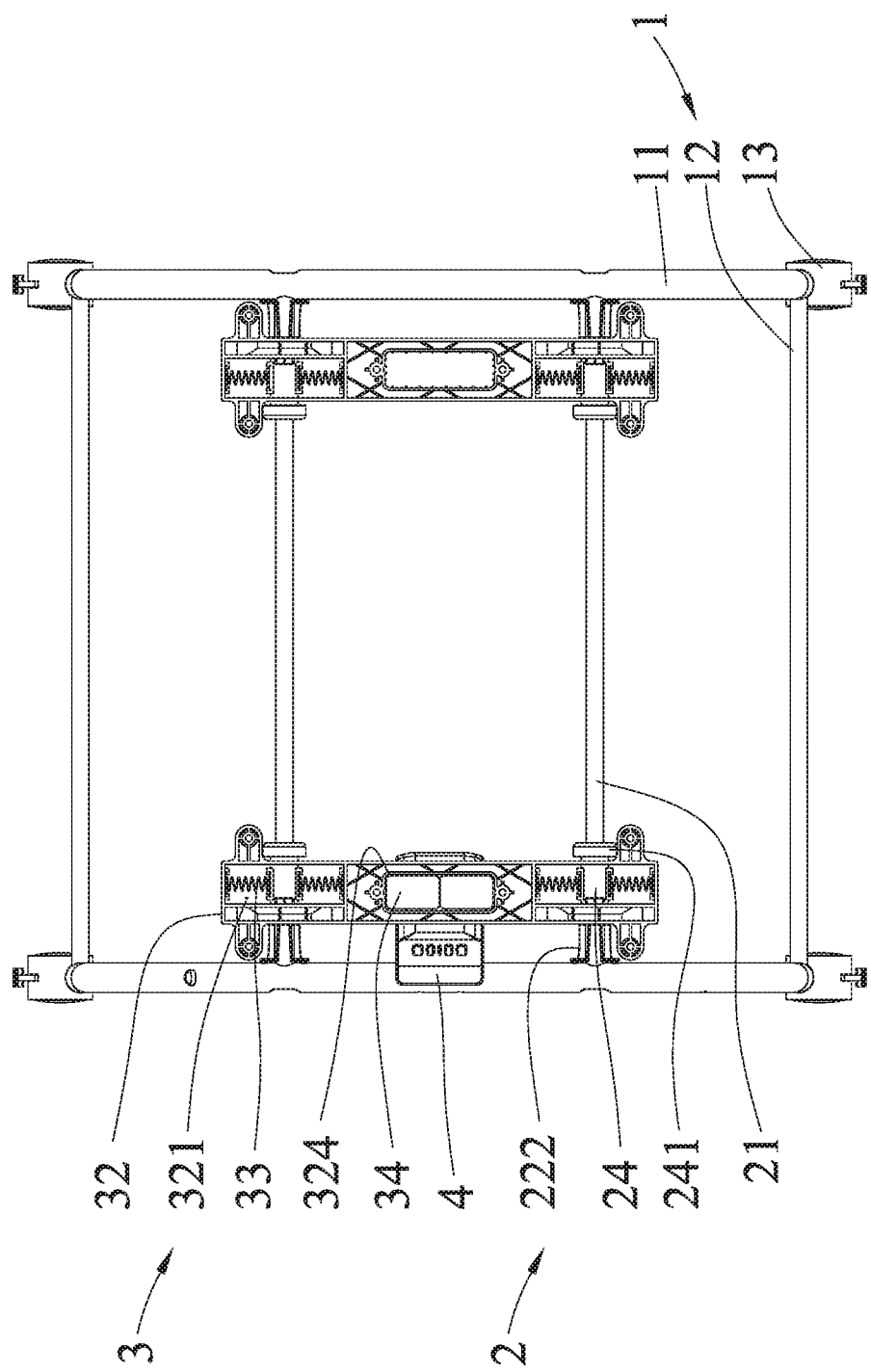
FIG. 2 is a partially top view of the electromagnetic cradle in accordance with the preferred embodiment of the present invention, wherein the bed is removed.
Figure 3:
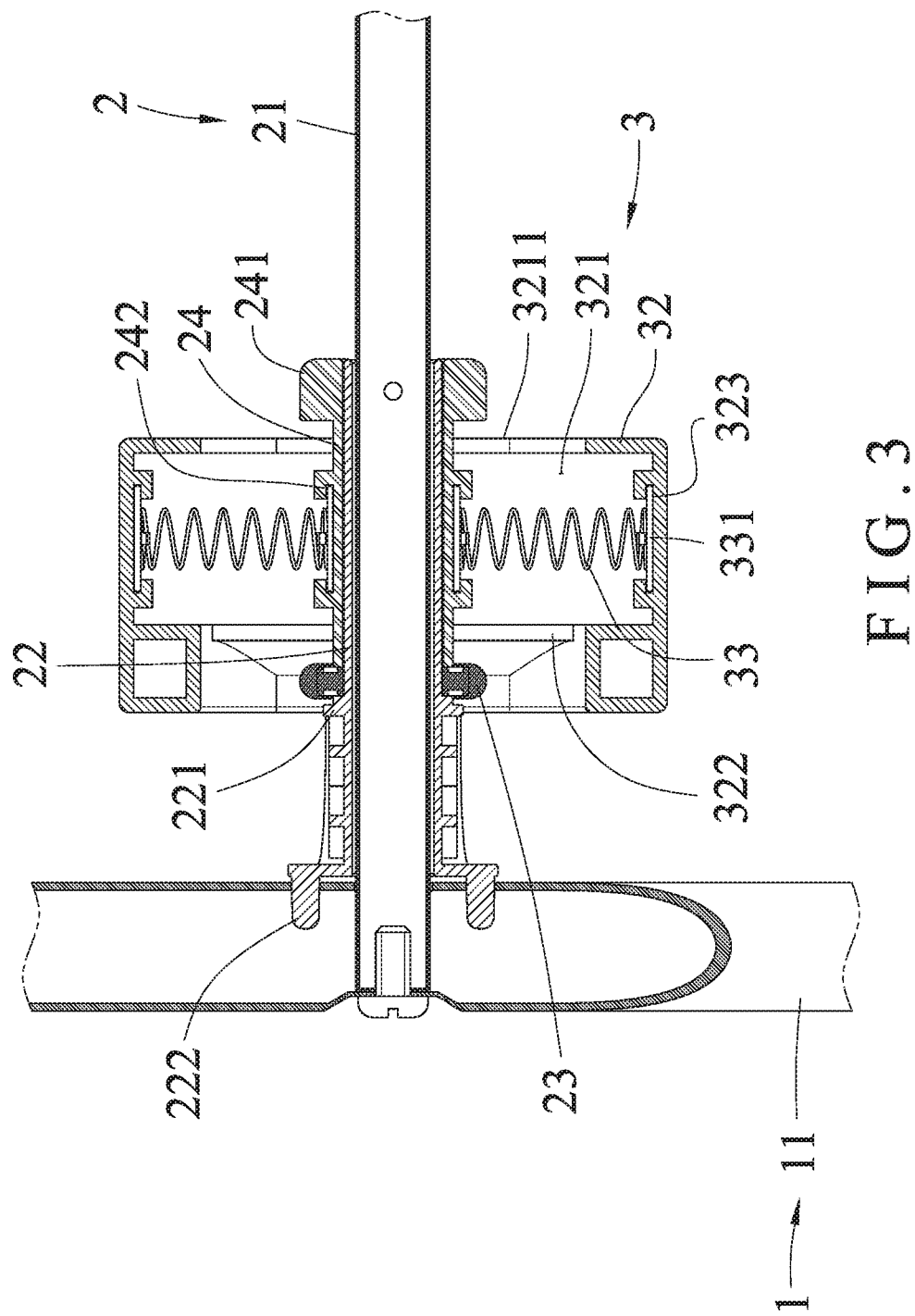
FIG. 3 is a partially cross-sectional view of the electromagnetic cradle in accordance with the preferred embodiment of the present invention.
Figure 4:
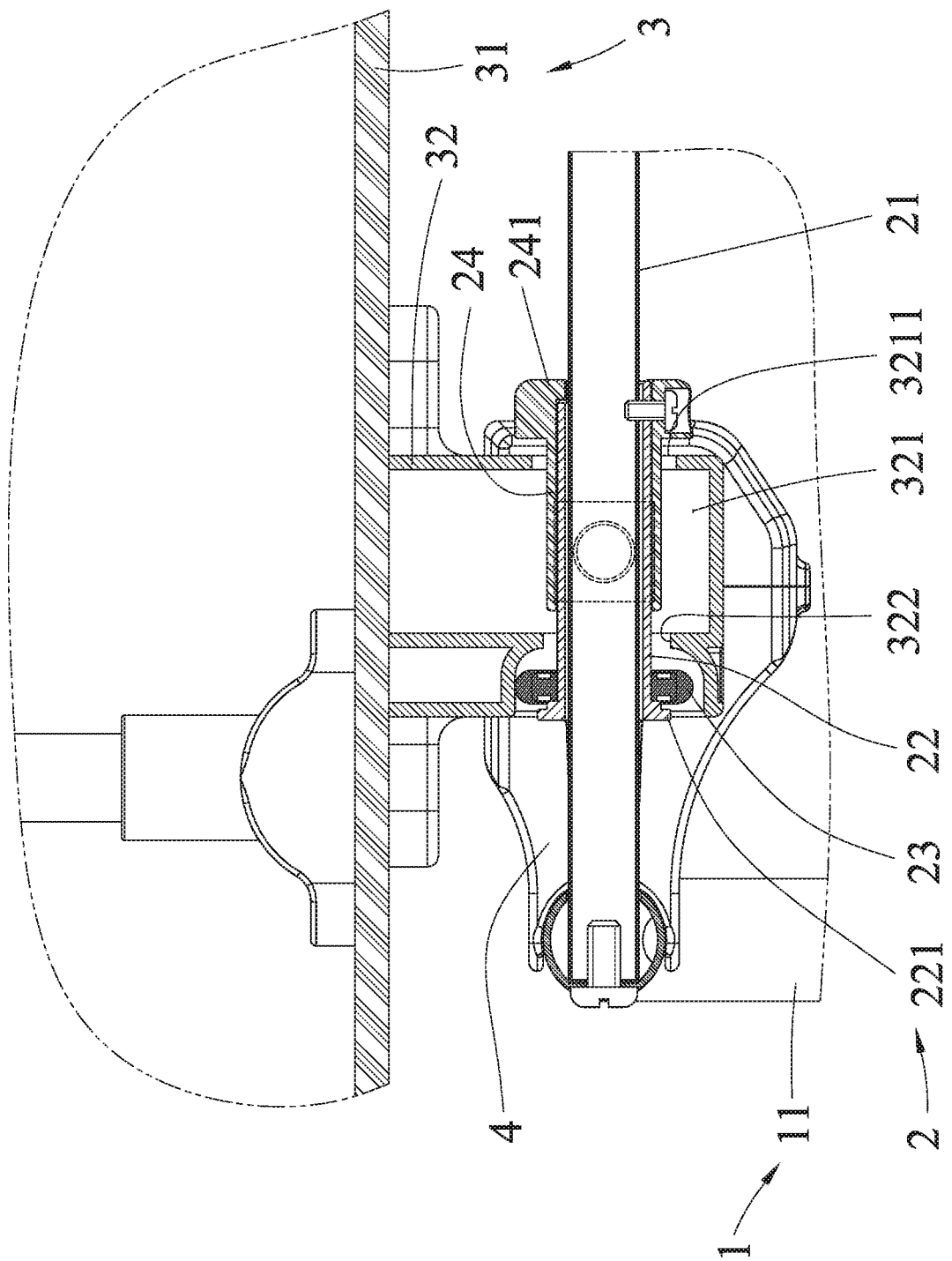
FIG. 4 is another partially cross-sectional view of the electromagnetic cradle in accordance with the preferred embodiment of the present invention.

Referring to the drawings and initially to FIGS. 1-4, an electromagnetic cradle in accordance with the preferred embodiment of the present invention comprises a support frame 1, a fixed unit 2 mounted on the support frame 1, a movable unit 3 mounted on the fixed unit 2, and an electromagnetic device 4 secured on the support frame 1.

The fixed unit 2 includes two parallel fixed rods 21 secured on the support frame 1. Each of the two fixed rods 21 is provided with two mounting sleeves 22 which are secured on each of the two fixed rods 21 without producing relative displacement and rotation therebetween. Each of the mounting sleeves 22 is formed with a flange 221 protruding outward. Each of the mounting sleeves 22 is provided with a roller 23 and a fixed tube 24, with the roller 23 being located between the flange 221 and the fixed tube 24. The roller 23 is rotatably mounted on each of the mounting sleeves 22. The fixed tube 24 is secured on each of the mounting sleeves 22 without producing relative displacement and rotation therebetween. Preferably, each of the two fixed rods 21, each of the mounting sleeves 22 and the fixed tube 24 are locked and combined together by fasteners, such as screws, so that each of the two fixed rods 21, each of the mounting sleeves 22 and the fixed tube 24 cannot be displaced and rotated relative to each other.

The movable unit 3 includes a bed 31 and two movable blocks 32 mounted on a bottom of the bed 31. Each of the two movable blocks 32 is provided with two tracks 321, and the two fixed rods 21 of the fixed unit 2 extend through the two tracks 321 of each of the two movable blocks 32. Each of the two tracks 321 has a plurality of slots 3211. Each of the two tracks 321 receives the roller 23 and the fixed tube 24 of one of the mounting sleeves 22. Each of the two tracks 321 has a top closely abutting the respective roller 23 by the gravity effect. At least one spring 33 is received in each of the two tracks 321 and biased between each of the two tracks 321 and the respective fixed tube 24. Preferably, each of the two tracks 321 receives two springs 33 biased between two sides of each of the two tracks 321 and two sides of the respective fixed tube 24. The at least one spring 33 has two ends respectively secured to each of the two tracks 321 and the respective fixed tube 24. The at least one spring 33 has specified specification and elastic coefficient according to the practical requirement. At least one of the two movable blocks 32 has a top provided with a receiving recess 324, and at least one magnet 34 is mounted in the receiving recess 324. The at least one magnet 34 has poles directed toward the same direction. Preferably, two magnets 34 are mounted in the receiving recess 324, and the two magnets 34 have poles directed toward the same direction.

The electromagnetic device 4 is located under and corresponds to the at least one magnet 34 of the movable unit 3.

In the preferred embodiment of the present invention, the support frame 1 include two stands 11 and two crossbars 12 each secured between the two stands 11. Each of the two stands 11 has a substantially inverted U-shaped configuration. Each of the two crossbars 12 has two ends secured to the two stands 11 respectively. Each of the two fixed rods 21 of the fixed unit 2 is secured between the two stands 11. Each of the two fixed rods 21 of the fixed unit 2 has two ends secured to the two stands 11 respectively. The electromagnetic device 4 is secured on one of the two stands 11.

In the preferred embodiment of the present invention, each of the two stands 11 of the support frame 1 is provided with at least one castor 13. Preferably, each of the two stands 11 of the support frame 1 is provided with two castors 13.

In the preferred embodiment of the present invention, each of the mounting sleeves 22 of the fixed unit 2 has an end formed with two protruding extensions 222 inserted into one of the two stands 11.

In the preferred embodiment of the present invention, the fixed tube 24 of the fixed unit 2 is formed with a projection 241 protruding from the respective track 321 of the movable unit 3 and located adjacent to one of the slots 3211 of the respective track 321. The projection 241 of the fixed tube 24 of the fixed unit 2 has a height greater than that of the respective slot 3211 of the movable unit 3.

In the preferred embodiment of the present invention, each of the two tracks 321 of the movable unit 3 is formed with two stop walls 322 which are located between the roller 23 and the projection 241 of the fixed tube 24. The roller 23 of the fixed unit 2 has a diameter greater than a distance between the two stop walls 322 of the movable unit 3, so that the roller 23 of the fixed unit 2 is stopped by the two stop walls 322 of the movable unit 3. Thus, each of the two movable blocks 32 of the movable unit 3 is limited between the roller 23 and the projection 241 of the fixed unit 2.

In the preferred embodiment of the present invention, each of the two tracks 321 of the movable unit 3 is provided with at least one first groove 323. The fixed tube 24 of the fixed unit 2 is provided with at least one second groove 242. The at least one spring 33 is provided with two inserts 331 secured on the two ends thereof. The two inserts 331 of the at least one spring 33 are respectively inserted into the at least one first groove 323 and the at least one second groove 242.

Figure 5:
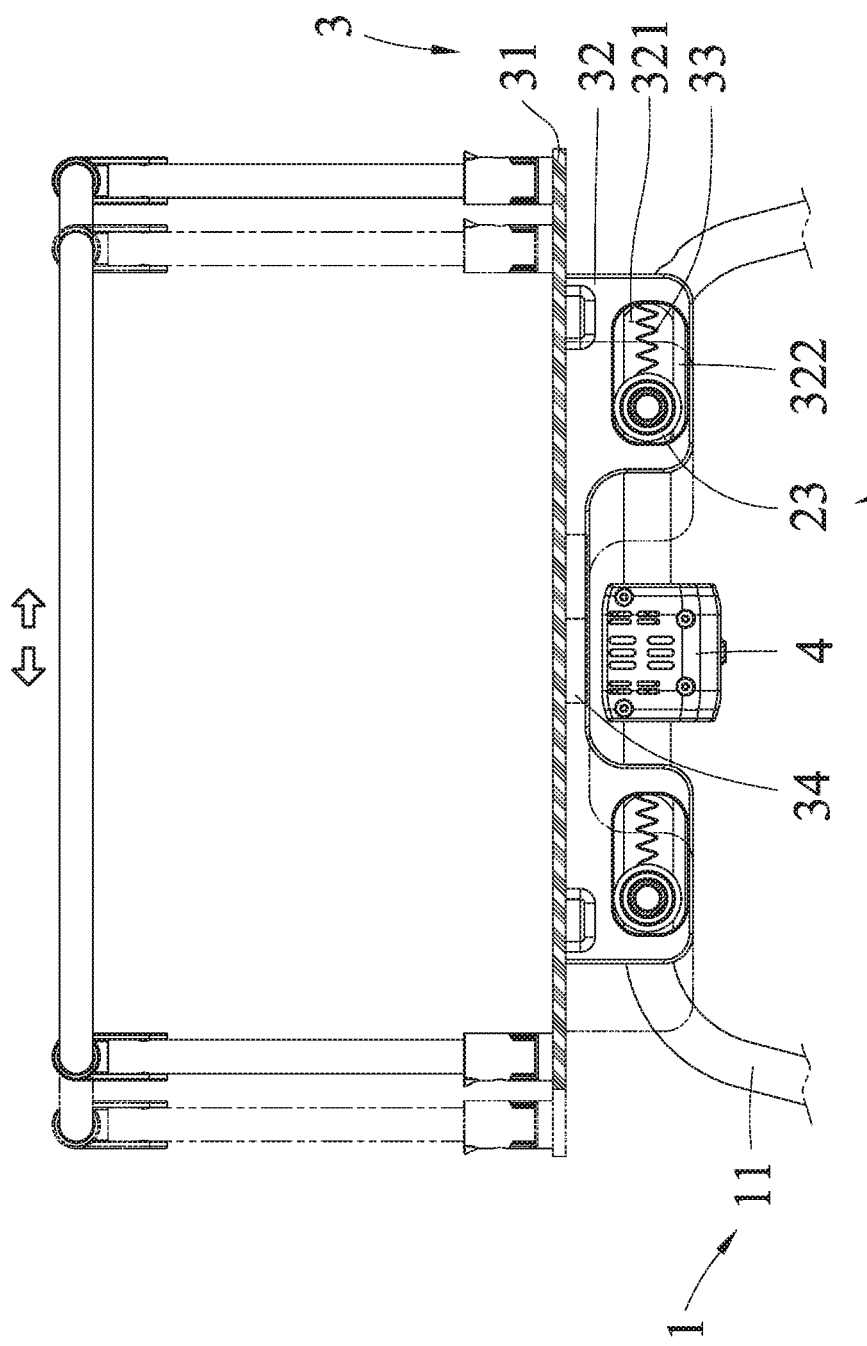
FIG. 5 is a schematic operational view of the electromagnetic cradle in accordance with the preferred embodiment of the present invention.

In operation, referring to FIG. 5 with reference to FIGS. 1-4, after the electromagnetic device 4 is energized, the electromagnetic device 4 produces a magnetic field which has a magnetic force to repel or attract the at least one magnet 34. At this time, the electromagnetic device 4 is secured on one of the two stands 11 so that the electromagnetic device 4 is restricted and cannot be moved freely. At the same time, each of the two movable blocks 32 is movable relative to the two fixed rods 21 by rolling of the rollers 23, and the bed 31 is movable with the two movable blocks 32. In such a manner, when an external force is applied on the bed 31, the bed 31 is moved, and the two movable blocks 32 are moved with the bed 31, so that the at least one magnet 34 is moved to pass the electromagnetic device 4.

If the electromagnetic device 4 repels the at least one magnet 34, the at least one magnet 34 is pushed by the electromagnetic device 4 to drive and move one of the two movable blocks 32, so as to move the bed 31 by the two movable blocks 32. Thus, when the bed 31 is initially pushed and moved sideward by the user, the two movable blocks 32 are moved forward, and the springs 33 biased between each of the two tracks 321 and the respective fixed tube 24 are stretched or compressed. After the two movable blocks 32 stop moving forward, the bed 31 is released, the two movable blocks 32 and the bed 31 are moved backward by the restoring force of the springs 33. When the at least one magnet 34 is moved to approach the electromagnetic device 4, the repelling force applied by the electromagnetic device 4 is overcome by the restoring force of the springs 33 and by the velocity of the two movable blocks 32 and the bed 31, so that the two movable blocks 32 and the bed 31 are moved backward successively. After the at least one magnet 34 passes the electromagnetic device 4, the repelling force applied by the electromagnetic device 4 drives and aids the at least one magnet 34 to move backward, so that the two movable blocks 32 and the bed 31 are accelerated to move backward. At this time, when the two movable blocks 32 are moved backward, the springs 33 biased between each of the two tracks 321 and the respective fixed tube 24 are also stretched or compressed. Thus, after the two movable blocks 32 stop moving backward, the two movable blocks 32 and the bed 31 are moved forward by the restoring force of the springs 33. In such a manner, the two movable blocks 32 are moved forward and backward by repeated tensile and contractive oscillation of the springs 33 and by the repelling force of the electromagnetic device 4 applied on the at least one magnet 34, so that the two movable blocks 32 and the bed 31 are moved reciprocally as shown in FIG. 5, to achieve an elastic smooth rocking effect.

It is appreciated that, when the two movable blocks 32 are moved, the top of each of the two tracks 321 closely presses the respective roller 23, so that the respective roller 23 is rolled by friction between the top of each of the two tracks 321 and the respective roller 23. Thus, the two movable blocks 32 are moved smoothly and stably by rolling of all of the rollers 23.

On the contrary, if the electromagnetic device 4 attracts the at least one magnet 34, the at least one magnet 34 is pulled by the electromagnetic device 4 to drive and move one of the two movable blocks 32, so as to move the bed 31 by the two movable blocks 32. Thus, when the bed 31 is initially pushed and moved sideward by the user, the two movable blocks 32 are moved forward, and the springs 33 biased between each of the two tracks 321 and the respective fixed tube 24 are stretched or compressed. After the two movable blocks 32 stop moving forward, the bed 31 is released, the two movable blocks 32 and the bed 31 are moved backward by the restoring force of the springs 33. When the at least one magnet 34 is moved to approach the electromagnetic device 4, the magnetically attractive force applied by the electromagnetic device 4 aids the backward movement of the at least one magnet 34, so that the two movable blocks 32 and the bed 31 are accelerated to move backward. After the at least one magnet 34 passes the electromagnetic device 4, the magnetically attractive force applied by the electromagnetic device 4 forms a resistance that is overcome by the restoring force of the springs 33 and by the velocity of the two movable blocks 32 and the bed 31, so that the two movable blocks 32 and the bed 31 are moved backward successively. At this time, when the two movable blocks 32 are moved backward, the springs 33 biased between each of the two tracks 321 and the respective fixed tube 24 are also stretched or compressed. Thus, after the two movable blocks 32 stop moving backward, the two movable blocks 32 and the bed 31 are moved forward by the restoring force of the springs 33. In such a manner, the two movable blocks 32 are moved forward and backward by repeated tensile and contractive oscillation of the springs 33 and by the magnetically attractive force of the electromagnetic device 4 applied on the at least one magnet 34, so that the two movable blocks 32 and the bed 31 are moved reciprocally as shown in FIG. 5, to achieve an elastic smooth rocking effect.

In conclusion, the baby is placed in the bed 31. Then, the electromagnetic device 4 is energized to produce a magnetic field which has a magnetic force to repel or attract the at least one magnet 34. At this time, the electromagnetic device 4 is secured on one of the two stands 11 so that the electromagnetic device 4 is restricted and cannot be moved. Thus, when the electromagnetic device 4 and the at least one magnet 34 are subjected to the magnetic force, the at least one magnet 34 drives the two movable blocks 32 to move sideward. When the two movable blocks 32 are moved, the springs 33 biased between each of the two tracks 321 and the respective fixed tube 24 are stretched or compressed repeatedly and are oscillated successively, so that the movable unit 3 is reciprocally rocked leftward and rightward, so as to pacify the baby in the movable unit 3.

Accordingly, the movable unit 3 achieves a rocking or shaking effect by the magnetic reaction between the electromagnetic device 4 and the at least one magnet 34, and by the oscillating elasticity of the springs 33, so that the movable unit 3 is moved smoothly and elastically, so as to pacify the baby placed in the movable unit 3. In addition, the electromagnetic cradle has a simplified construction, thereby decreasing the cost of fabrication and facilitating maintenance of the electromagnetic cradle.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. An electromagnetic cradle comprising:
   a support frame;
   a fixed unit mounted on the support frame;
   a movable unit mounted on the fixed unit; and
   an electromagnetic device secured on the support frame; wherein:
   the fixed unit includes two parallel fixed rods secured on the support frame;
   each of the two fixed rods is provided with two mounting sleeves which are secured on each of the two fixed rods without producing relative displacement and rotation therebetween;
   each of the mounting sleeves is formed with a flange protruding outward;
   each of the mounting sleeves is provided with a roller and a fixed tube, with the roller being located between the flange and the fixed tube;
   the fixed tube is secured on each of the mounting sleeves without producing relative displacement and rotation therebetween;
   the movable unit includes a bed and two movable blocks mounted on a bottom of the bed;
   each of the two movable blocks is provided with two tracks, and the two fixed rods of the fixed unit extend through the two tracks of each of the two movable blocks;
   each of the two tracks has a plurality of slots;
   each of the two tracks receives the roller and the fixed tube of one of the mounting sleeves;
   each of the two tracks abuts the respective roller;
   at least one spring is received in each of the two tracks and biased between each of the two tracks and the respective fixed tube;
   the at least one spring has two ends respectively secured to each of the two tracks and the respective fixed tube;
   at least one of the two movable blocks is provided with a receiving recess, and at least one magnet is mounted in the receiving recess; and
   the electromagnetic device is located under and corresponds to the at least one magnet of the movable unit.

2. The electromagnetic cradle of claim 1, wherein:
   the support frame include two stands and two crossbars each secured between the two stands;
   each of the two fixed rods of the fixed unit is secured between the two stands; and
   the electromagnetic device is secured on one of the two stands.

3. The electromagnetic cradle of claim 2, wherein each of the two stands of the support frame is provided with at least one castor.

4. The electromagnetic cradle of claim 2, wherein each of the mounting sleeves of the fixed unit has an end formed with two protruding extensions inserted into one of the two stands.

5. The electromagnetic cradle of claim 1, wherein:
   the fixed tube of the fixed unit is formed with a projection protruding from the respective track of the movable unit and located adjacent to one of the slots of the respective track; and
   the projection of the fixed tube of the fixed unit has a height greater than that of the respective slot of the movable unit.

6. The electromagnetic cradle of claim 1, wherein:
   each of the two tracks of the movable unit is formed with two stop walls which are located between the roller and the projection of the fixed tube; and
   the roller of the fixed unit has a diameter greater than a distance between the two stop walls of the movable unit.

7. The electromagnetic cradle of claim 1, wherein:
   each of the two tracks of the movable unit is provided with at least one first groove;
   the fixed tube of the fixed unit is provided with at least one second groove;

the at least one spring is provided with two inserts secured on the two ends thereof; and the two inserts of the at least one spring are respectively inserted into the at least one first groove and the at least one second groove.

\* \* \* \* \*